(12) United States Patent
Kai et al.

(10) Patent No.: US 12,200,150 B2
(45) Date of Patent: Jan. 14, 2025

(54) INTEGRATED METHOD FOR UPLOADING DATA ON A BLOCKCHAIN

(71) Applicant: AIO Technology Reserve Pte. Ltd., The Central Singapore (SG)

(72) Inventors: Chu George Kai, Taipei (TW); Shih-Pu Huang, Taipei (TW)

(73) Assignee: AIO Technology Reserve Pte. Ltd., The Central Singapore (SG)

( * ) Notice: Subject to any disclaimer, the term of this patent is extended or adjusted under 35 U.S.C. 154(b) by 294 days.

(21) Appl. No.: 17/869,835

(22) Filed: Jul. 21, 2022

(65) Prior Publication Data
US 2023/0024190 A1   Jan. 26, 2023

Related U.S. Application Data

(60) Provisional application No. 63/224,886, filed on Jul. 23, 2021.

(51) Int. Cl.
*H04L 9/00* (2022.01)
*H04L 9/06* (2006.01)

(52) U.S. Cl.
CPC .............. *H04L 9/50* (2022.05); *H04L 9/0643* (2013.01)

(58) Field of Classification Search
CPC . H04L 9/40; H04L 9/50; H04L 9/0643; G06F 21/10; G06F 21/60; G06F 21/62; G06F 21/64
See application file for complete search history.

(56) References Cited

U.S. PATENT DOCUMENTS

| | | | | |
|---|---|---|---|---|
| 10,476,847 B1* | 11/2019 | Smith | .................. | H04L 63/102 |
| 10,490,304 B2* | 11/2019 | Shah | .................... | G06Q 50/01 |
| 10,762,927 B2* | 9/2020 | Yang | ...................... | H04W 4/44 |
| 11,200,329 B1* | 12/2021 | Holsman | .............. | G06F 21/602 |
| 11,443,278 B2* | 9/2022 | Liu | ........................ | H04L 63/123 |
| 11,823,120 B2* | 11/2023 | Padmanabhan | ...... | G06Q 10/087 |
| 11,935,048 B2* | 3/2024 | Ma | ...................... | G06Q 20/4016 |
| 11,971,874 B2* | 4/2024 | Padmanabhan | ......... | H04L 67/10 |

* cited by examiner

*Primary Examiner* — Hosuk Song
(74) *Attorney, Agent, or Firm* — Amin, Turocy & Watson, LLP

(57) ABSTRACT

An integrated method for uploading data on a blockchain comprising: receiving an editable text data or an editable form data by the data source computer device; determining whether a file update time of the editable text data or the editable form data is later than a last change time stored by the service server and corresponding to the data by the data source computer device; sending the data to the service server when the data source computer device determined that the file update time is later than the last change time by the data source computer device; executing a corresponding service that is able to access data of a blockchain and upload the data to the blockchain according to the data from the data source computer device by the service server. Therefore, the data can be efficiently and quickly uploaded to the blockchain.

9 Claims, 2 Drawing Sheets

INTEGRATED METHOD FOR UPLOADING DATA ON A BLOCKCHAIN

RELATED APPLICATIONS

BACKGROUND OF THE INVENTION

1. Field of the Invention

The present invention generally relates to an integrated method for uploading data on a blockchain, and, more particularly, to an integrated method for uploading data to a blockchain that allows data to be quickly uploaded to the blockchain.

2. Description of the Related Art

Smart contract is a special protocol used for drafting contracts by using blockchain technology, specifically, a protocol for data access services on the blockchain. Due to its immutability and traceability, Smart contract has high security and high transaction efficiency. However, how to allow ordinary users to easily operate or use Smart contracts, and how to efficiently and quickly upload the Smart contracts to the blockchain (referred to as on-chain) have become problems to be solved.

In addition, according to different blockchain protocols, there will be other services for data access to the blockchain that are different from Smart contract. How to quickly upload the services of accessing data on the blockchain to the blockchain (also referred to as on-chain), is also an urgent problem to be solved.

SUMMARY OF THE INVENTION

In light of solving the foregoing problems of the prior art, the present invention provides integrated method and system for uploading data to a blockchain capable of uploading data efficiently and quickly.

In order to solve the aforementioned problems, the integrated method for uploading data to a blockchain of the present invention, applied in a data source computer device and a service server, comprises steps (A) to (D), In step (A), receiving, by the data source computer device, an editable text data or an editable form data;

In step (B), determining, by the data source computer device, whether a file update time of the editable text data or the editable form data is later than a last change time stored by the service server and corresponding to the editable text data or editable form data;

In step (C), sending, by the data source computer device, the editable text data or editable form data to the service server when the data source computer device determined that the file update time is later than the last change time; and In step (D), executing, by the service server, a corresponding service that is able to access data of a blockchain and upload the editable text data or the editable form data to the blockchain according to the editable text data or editable form data from the data source computer device.

In an embodiment, the integrated method for uploading data on a blockchain further comprises a step (E) following step (D): (E) when the corresponding service that is able to access the data of the blockchain is successfully executed and the editable text data or the editable form data is uploaded to the blockchain, the service server receives a hash value and an on-chain time from the blockchain, then stores the hash value, and updates the on-chain time as the last change time corresponding to the editable text data or editable form data.

In an embodiment, wherein in step (E), the service server further transmits the hash value to the data source computer device to store the hash value on the data source computer device.

In an embodiment, wherein in step (E), when the corresponding service that is able to access data of the blockchain is failed to be executed and he editable text data or the editable form data is failed to be uploaded to the blockchain, the service server receives a failure message from the blockchain and stores the failure message.

In an embodiment, wherein in the (E), the service server further transmits the failure message to the data source computer device to store the failure message on the data source computer device.

In an embodiment, wherein in step (A), the editable text data or the editable form data is a Google sheet, and wherein in step (B), the data source computer device is a server that provides Google services, and uses Google Apps Script to determine whether the file update time of the editable text data or the editable form data is later than the last change time.

In an embodiment, wherein in step (A), the editable text data or the editable form data is an Excel spreadsheet.

In an embodiment, wherein in step (C), the editable text data or the editable form data is transmitted to the service server via an application programming interface (API) or a network (Web).

In an embodiment, wherein the data source computer device is a server that provides OneDrive services.

In an embodiment, wherein the service that is able to access data on the blockchain is Smart contract.

The effect of the present invention is: when the file update time of the editable text data or the editable form data is determined to be later than the last change time stored by the service server and corresponding to the editable text data or the editable form data, the service server executes the corresponding Smart contract according to the editable text data or the editable form data, so that the data can be efficiently and quickly uploaded to the blockchain.

BRIEF DESCRIPTION OF THE DRAWINGS

Other features and effects of the present invention will be clearly presented in the embodiments with reference to the drawings, wherein.

DETAILED DESCRIPTION

Figure 1:
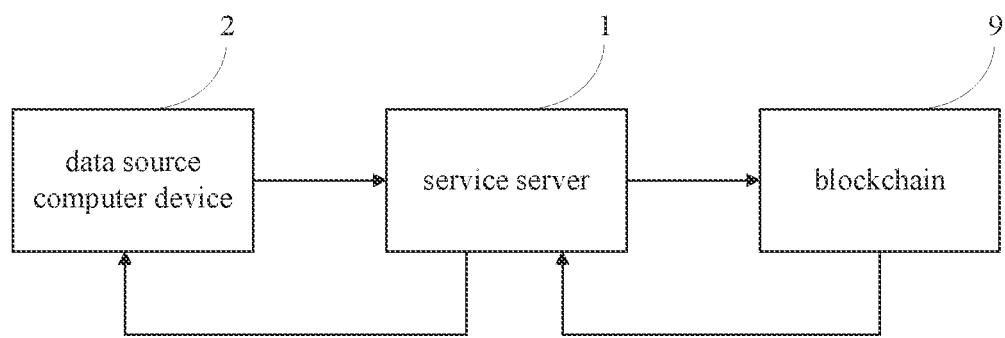
FIG. 1 is a block diagram illustrating a data source computer device and a service server to which the integrated method for uploading data on a blockchain of the present invention is applicable.

Before the present invention is described in detail, it should be noted that in the following description, similar elements are designated by the same reference numerals.

Figure 2:
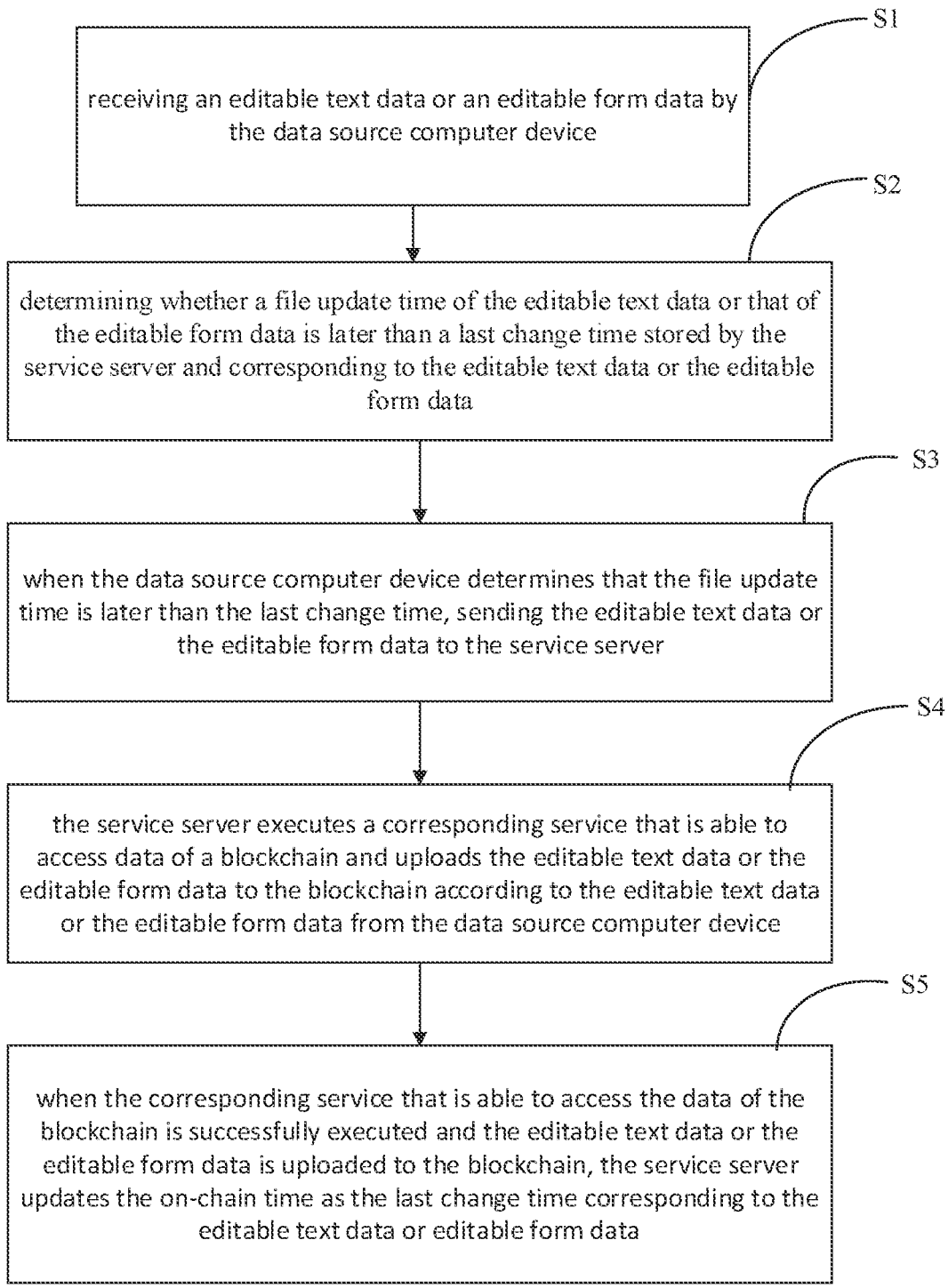
FIG. 2 is a flowchart illustrating an embodiment of the integrated method for uploading data on a blockchain of the present invention.

Please refer to FIG. 1 and FIG. 2. In an embodiment of the integrated method for uploading data on a blockchain of the present invention, the method may be applied to a data source computer device 2 and a service server 1, and may comprise steps S1 to S5. The data source computer device 2 is connected with the service server 1.

Step S1, receiving an editable text data or an editable form data by the data source computer device 2. More specifically, in this embodiment, the editable text data or the editable form data may be a Google sheet and the data source computer device is a server that provides Google services. When a user executes an application program (APP) provided by the service server 1 through a computer device (such as a smart phone), the editable text data or the editable form data may be generated by the application program. Then, the editable text data or the editable form data is transmitted to the data source computer device 2.

Step S2, determining, by the data source computer device 2, whether a file update time of the editable text data or that of the editable form data is later than a last change time stored by the service server 1 and corresponding to the editable text data or the editable form data. Please refer to the previous embodiment, the data source computer device 2 uses Google Apps Script to determine whether the file update time of the editable text data or that of the editable form data is later than the last change time.

Step S3, sending, by the data source computer device 2, the editable text data or the editable form data to the service server 1 when the data source computer device 2 determined that the file update time is later than the last change time. When the data source computer device 2 determines that the file update time is later than the last change time, it means that the content of the editable text data or that of the editable form data has been updated, and yet to be uploaded to the blockchain completely. Therefore, the data source computer device 2 would send the editable text data or the editable form data to the service server 1.

Step S4, executing, by the service server, a corresponding service that is able to access data on a blockchain and upload the editable text data or the editable form data to the blockchain according to the editable text data or the editable form data from the data source computer device 2. The service server 1 executes a corresponding service that is able to access data of a blockchain and uploads the editable text data or the editable form data to the blockchain 9 according to the editable text data or the editable form data from the data source computer device 2. In this embodiment, the service that is able to access data on the blockchain may be Smart contract. The following description will illustrate the invention using an exemplary Smart contract. In other words, the application program (APP) provided by the service server 1 and installed on the computer device (such as a smart phone) is used to allow users to easily and conveniently execute Smart contracts or other function such as "on-chain" service which is able to access data on the blockchain. As used herein, the term "on-chain," "on chain," or "on-chained" refers to uploading the Smart contract or the services of accessing data on the blockchain to the blockchain.

In step S5, when the corresponding service that is able to access the data of the blockchain is successfully executed and the editable text data or the editable form data is uploaded to the blockchain, the service server receives a hash value and an on-chain time from the blockchain, then stores the hash value, and updates the on-chain time as the last change time corresponding to the editable text data or editable form data. When Smart contract in on- chained successfully, the service server 1 will receive a hash value and an on-chain time from the blockchain 9. Then the service server 1 stores the hash value which is used to correspond to an on-chain position after the data is uploaded to the blockchain. The service server 1 will further update the on-chain time to the last change time corresponding to the editable text data or the editable form data, and further transmit the hash value to the data source computer device 2 to store the hash value on the data source computer device 2. For example, the last change time that has not been updated is 10:00 on Day A, the file update time is 20:00 on Day A, and the on-chain time is 20:30 on Day A, then the updated last change time is 20:30 on Day A.

When the Smart contract is failure to be on-chained, the service server 1 will receive a failure message from the blockchain 9 and store the failure message. The service server 1 will further transmit the failure message to the data source computer device 2 to store the failure message on the data source computer device 2.

In addition, it should be specially noted that in other embodiments, in step S1, the editable text data or the editable form data may be an Excel spreadsheet. In addition, the data source computer device 2 may also be the user's computer device (such as a smart phone). In step S3, the editable text data or the editable form data is sent to the service server 1 by an application program via an application programming interface (API) or a network (Web).

In summary, in the present invention, the file update time of the editable text data or the editable form data may be determined whether it is later than the last change time stored by the service server and corresponding to the editable text data or the editable form data by the service server 1 and the service server 1 may execute the corresponding Smart contract or other services that is able to access data of the blockchain according to the editable text data or the editable form data, so that the data can be efficiently and quickly uploaded to the blockchain 9. Therefore, the object of the present invention can fully be achieved.

As utilized herein, the articles "a" and "an" as used in this application and the appended claims should generally be construed to mean "one or more" unless specified otherwise or clear from context to be directed to a singular form.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. An integrated method for uploading data on a blockchain, applied in a data source computer device and a service server, comprising:
    (A) receiving, by the data source computer device, an editable text data or an editable form data from a computer device executing an application program provided by the service server;
    (B) determining, by the data source computer device, whether a file update time of the editable text data or the editable form data is later than a last change time stored by the service server and corresponding to the editable text data or editable form data;
    (C) sending, by the data source computer device, the editable text data or the editable form data to the service server when the data source computer device determined that the file update time is later than the last change time;
    (D) executing, by the service server, a corresponding service that is able to access data on a blockchain and upload the editable text data or the editable form data to the blockchain according to the editable text data or the editable form data from the data source computer device; and (E) when the corresponding service that is able to access the data of the blockchain is successfully executed and the editable text data or the editable form data is uploaded to the blockchain, the service server receives a hash value and an on-chain time from the blockchain, then stores the hash value, and updates the on-chain time as the last change time corresponding to the editable text data or editable form data.

2. The integrated method for uploading data on a blockchain of claim 1, wherein in step (E), the service server further transmits the hash value to the data source computer device to store the hash value on the data source computer device.

3. The integrated method for uploading data on a blockchain of claim 2, wherein in step (E), when the corresponding service that is able to access the data of the blockchain is failed to be executed and the editable text data or the editable form data is failed to be uploaded to the blockchain, the service server receives a failure message from the blockchain and stores the failure message.

4. The integrated method for uploading data on a blockchain of claim 3, wherein in step (E), the service server further transmits the failure message to the data source computer device to store the failure message on the data source computer device.

5. The integrated method for uploading data on a blockchain of claim 1, wherein in step (A), the editable text data or the editable form data is a Google sheet, and wherein in step (B), the data source computer device is a server that provides Google services, and uses Google Apps Script to determine whether the file update time of the editable text data or the editable form data is later than the last change time.

6. The integrated method for uploading data on a blockchain of claim 1, wherein in step (A), the editable text data or the editable form data is an Excel spreadsheet.

7. The integrated method for uploading data on a blockchain of claim 1, wherein in step (C), the editable text data or the editable form data is transmitted to the service server via an application programming interface (API) or a network (Web).

8. The integrated method for uploading data on a blockchain of claim 1, wherein the data source computer device is a server that provides OneDrive services.

9. The integrated method for uploading data on a blockchain of claim 1, wherein the service that is able to access data on the blockchain is Smart contract.

* * * * *